United States Patent [19]

Kolakowski

[11] 4,273,746
[45] Jun. 16, 1981

[54] DESULFATION OF BATTERY MUD

[75] Inventor: Michael A. Kolakowski, Milltown, N.J.

[73] Assignee: NL Industries, Inc., New York, N.Y.

[21] Appl. No.: 950,073

[22] Filed: Oct. 10, 1978

[51] Int. Cl.³ ............................................. C01G 21/14
[52] U.S. Cl. ..................................... 423/92; 423/434
[58] Field of Search ................. 423/92, 435, 619, 433, 423/434

[56] References Cited

U.S. PATENT DOCUMENTS

| 1,898,405 | 2/1933 | Svendsen | 423/92 |
| 3,883,348 | 5/1975 | Acoveno et al. | 423/92 |
| 3,892,563 | 7/1975 | LaPoint | 423/92 |
| 4,118,219 | 10/1978 | Elmore et al. | 423/92 |

OTHER PUBLICATIONS

*Handbook of Chemistry and Physics,* Forty-third Edition, published by The Chemical Rubber Publishing Co. (1961), p. 2011.

*Primary Examiner*—O. R. Vertiz
*Assistant Examiner*—Wayne A. Langel
*Attorney, Agent, or Firm*—Gerald K. White; Eugene Striffler, Jr.; Gary M. Nath

[57] ABSTRACT

In connection with the recycling of lead-acid batteries, lead-acid battery mud containing lead sulfate is desulfated by adding to the battery mud, which is maintained at a temperature less than 140° F., an aqueous solution containing an ammonium reagent such as ammonium carbonate or ammonium bicarbonate. The ammonium reagent reacts with the lead sulfate to form an aqueous solution of ammonium sulfate and a lead carbonate precipitate. The aqueous solution of ammonium sulfate is then separated from the battery mud containing the lead carbonate precipitate.

2 Claims, 1 Drawing Figure

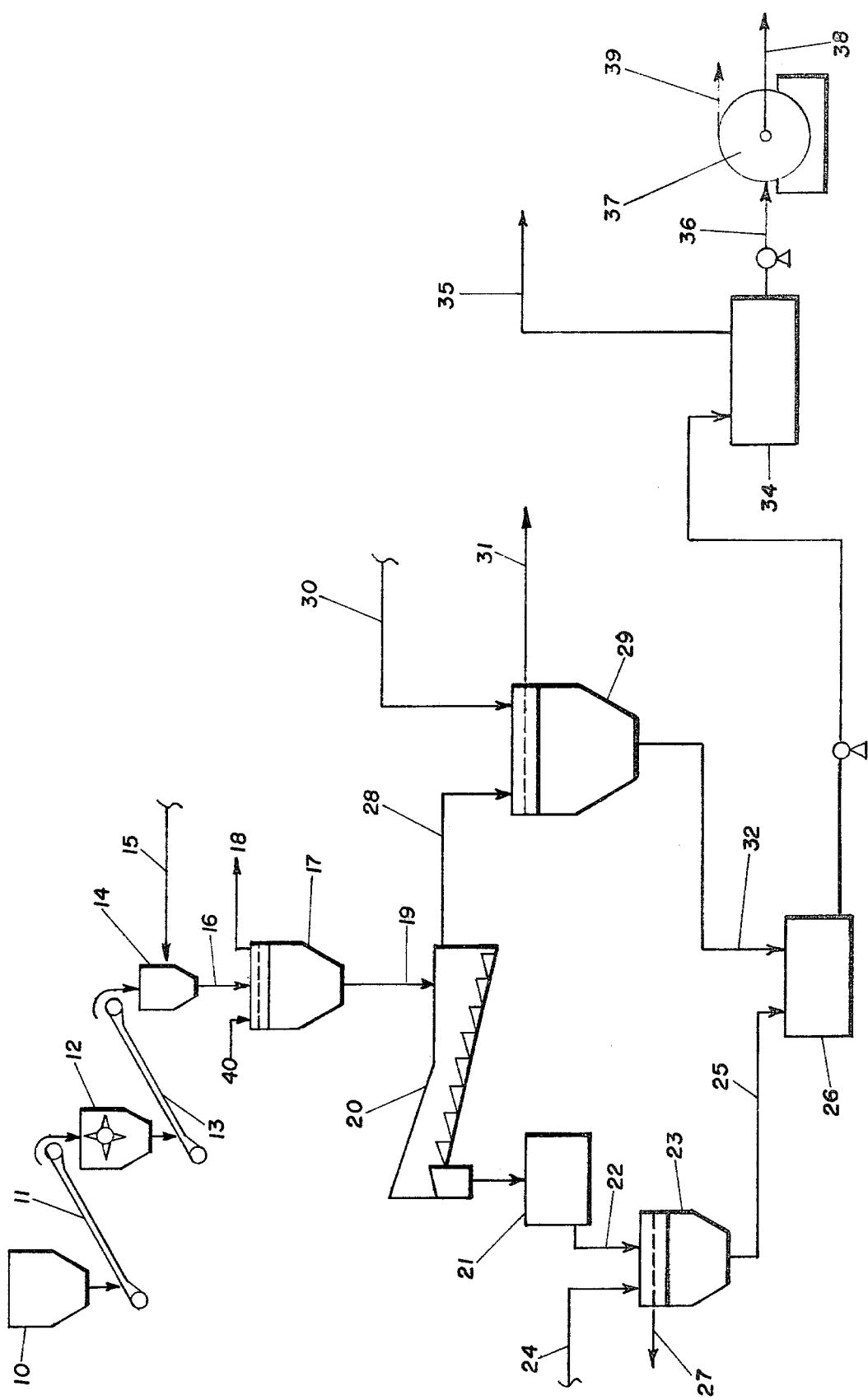

DESULFATION OF BATTERY MUD

The invention pertains to the desulfation of battery mud during a lead-acid battery recycling process wherein an aqueous solution of ammonium carbonate or ammonium bicarbonate is introduced into battery mud which is maintained at a temperature of less than 140° F. to form an aqueous ammonium sulfate solution and a lead carbonate precipitate. The lead carbonate precipitate along with other lead containing compounds such as PbO and $PbO_2$ in the battery mud is then separated from the aqueous ammonium sulfate solution. Lead values in the lead carbonate, PbO, and $PbO_2$ can then be recovered by reduction of the lead containing compounds in a lead smelter.

In the past, recycling of lead acid batteries has preceeded by draining off the free sulfuric acid and then crushing the lead-acid batteries into crushed battery cases and separators, crushed metallics, and battery mud, the battery mud being comprised of residual sulfuric acid, lead sulfate, PbO, and $PbO_2$. The residual sulfuric acid was then neutralized with a base such as ammonium hydroxide. The lead sulfate in the battery mud, however, was not desulfated. The crushed lead-acid batteries were then separated into their major components by classification and the lead values contained in the crush metallics and in the battery mud where recovered by reduction in the smelter. A major disadvantage with this process was that as the lead sulfate was reduced in a smelter, $SO_2$ gas was formed. In order to prevent large discharges of $SO_2$ into the atmosphere, extensive and costly off-gas treatment was required to remove the $SO_2$ prior to discharging the smelter off-gas to the atmosphere.

Previous methods for desulfating the lead sulfate and the battery mud prior to smelting include that described in U.S. Pat. No. 2,146,294 and additionally described in a subsequent article by the same patentee entitled "How to Smelt Battery Plate Scrap", Engineering and Mining Journal, 145 (March 1944), page 80 et seq. In this prior art process, recylced lead-acid batteries, prior to smelting, are washed free of sulfuric acid and then soaked in an alkaline aqueous solution for several days. The alkaline aqueous solution comprises an alkali metal compound such as sodium carbonate dissolved in water. The lead values were then recovered by smelting the treated lead-acid batteries.

Another prior art method for desulfating battery mud is described in U.S. Pat. No. 3,689,253. In this process lead-acid batteries are crushed into small pieces. Next, the battery mud is separated from the crushed metallics and the crushed battery cases and separators. Following separation of the battery mud from the crushed battery material, the mud is thickened and then treated with an aqueous solution containing a treating agent such as an alkali metal salt or an alkali metal hydroxide such as sodium carbonate. Next, the treated sludge is separated from the aqueous treating solution which now contains the sulfates. The lead values are subsequently recovered by smelting the treated sludge. A disadvantage with this process is that it requires the battery mud to be separated from the rest of the crushed battery material and thickened before treatment.

A further disadvantage with both of the above described processes is that desulfation occurs by using an alkaline metal salt or an alkali metal hydroxide. Should the alkali metal treating agent be not completely removed from the treated sludge prior to smelting, an adverse effect upon the smelting operation will occur.

Another process for desulfating battery mud involves the introduction of $NH_3$ and $CO_2$ gas into the battery mud. This process, however, tends to gel the battery mud which makes further processing difficult. In addition, rather low efficiencies of desulfation have been obtained.

U.S. Pat. No. 3,883,348 relates to a process for removal of sulfur from battery wrecker material with use of ammonium carbonate. Sulfur removal is accomplished through reaction of ammonium carbonate with lead sulfate leach material at a pressure from 5 to 100 psig and at a temperature from 20° C. to 80° C. to form lead carbonate and ammonium sulfate.

In contrast to the prior art, this invention provides an efficient, economical, and rapid method for desulfating battery mud. The instant invention does not require battery mud to be separated from the rest of the crushed material before it is treated with the ammonium treating agent or the use of elevated pressures.

Consequently the ammonium treating agent can be introduced into the battery mud prior to its separation, and, therefore, simplify the operation and decrease processing time. In addition, if not all the ammonium treating agent is washed free of the lead compounds in the battery mud prior to smelting, it will not adversely affect the smelting operation. Furthermore, the ammonium in the ammonium treating agent which forms soluble ammonium sulfate can be economically recovered and recycled to the desulfating treating system which decreases overall operating costs.

This invention relates to a process for desulfating lead-acid batteries containing lead sulfate which comprises the steps of adding to the battery mud, which is maintained at a temperature of less than 140° F., an aqueous solution containing an ammonium reagent such as ammonium carbonate, ammonium bicarbonate, or admixtures thereof. The ammonium reagent reacts with the lead sulfate to form an aqueous solution of ammonium sulfate and a lead carbonate precipitate. The aqueous solution of ammonium sulfate is then separated from the battery mud containing the lead carbonate precipitate.

The sole FIGURE is a schematic illustration of a lead-acid battery mud desulfation process in a lead-acid battery recovery system which comprises means for crushing lead-acid batteries, means for introducing an aqueous solution of an ammonium reagent into the battery mud of the crushed batteries, means for separating the crushed metallics and crushed battery cases and separators, from the reacted battery mud, and means for separating the PbO, $PbO_2$ and the formed lead carbonate precipitate from the formed aqueous solution of ammonium sulfate.

This invention pertains to desulfating battery mud in a lead-acid battery recycling process. In a typical lead-acid battery recovery process lead-acid batteries are first crushed into crushed battery cases and separators, crushed metallics, the metallics being comprised essentially of lead alloy grids and terminals, and battery mud, the battery mud being comprised essentially of sulfuric acid, lead sulfate, PbO, and $PbO_2$. These components are then separated from one another by various well known techniques so that the lead values contained in the battery mud and in the crushed metallic can be recovered by conventional means such as smelting. In addition to the techniques described hereinafter for crushing lead-acid batteries and separating them into various components, other means for crushing lead-acid batteries and separating them have been described in U.S. Pat. Nos. 3,300,043, 3,393,876, 3,561,684, 3,777,994, 3,892,563, and 4,042,177. In this invention, the lead-acid batteries are crushed and the battery mud or battery mud and crushed metallics are separated from the other crushed battery components. Either during crushing, during separation, or following separation, the battery mud is treated with an aqueous solution of ammonium carbonate, ammonium bicarbonate or admixtures thereof. The ammonium reagent reacts with the lead sulfate in the battery mud by the following reactions:

$$PbSO_4 + (NH_4)_2CO_3 \rightarrow PbCO_3 + (NH_4)_2SO_4$$

$$PbSO_4 + (NH_4)HCO_3 \rightarrow PbCO_3 + (NH_4)_2SO_4 + H_2O + CO_2$$

Unlike the technique taught in aforementioned U.S. Pat. No. 3,883,348, the process of this invention does not require the use of elevated pressure and associated reactor apparatus to carry out the desulfation reaction. This is required due to the high solids concentration on the order of greater than 50%, and consequent high stoichiometric requirements of ammonium carbonate. Because the reaction is highly exothermic and the heat capacity of the slurry is low, elevated pressure with cooling is needed. If elevated pressures and cooling were not utilized in practice of the patented process, a gel rather than a slurry would be obtained. A solid-liquid separation step cannot be performed on a gel and, hence, no separation of the sulfate from the lead could be accomplished.

On the other hand, the inventive process conducts desulfation within the decasing and separation apparatus normally employed in the secondary lead industry because only ambient or atmospheric pressure is required to perform the process of the invention. A solids concentration in the 10 to 20% solids range along with correspondingly low amounts of ammonium carbonate are utilized with the result that a true slurry can be maintained without the need for elevated pressure or cooling.

Sulfates contained in the battery mud are converted to an aqueous solution of ammonium sulfate. Lead contained in the lead sulfate form a lead carbonate precipitate. The aqueous ammonium sulfate solution containing the sulfates may be separated from the lead carbonate precipitate and solid PbO and PbO$_2$ by use of conventional separation techniques such as settling and centrifuging. The lead values in the battery mud are thereby separated from the sulfates and subsequently recovered by such techniques as smelting. Such smelting of the lead values occurs without the presence of such contaminates as sulfates and alkali metals.

It has also been discovered that when lead-acid battery mud is treated with an ammonium reagent, the mud must remain at a temperature less than 140° F. Because (NH$_4$)$_2$Co$_3$ decomposes to NH$_4$OH and CO$_2$ at 140° F. at atmospheric pressure and the presence of NH$_4$OH causes a deleterious gel, the battery mud temperature should not exceed approximately 140° F. Should the battery mud exceed this temperature, a gel will form which will make further processing difficult and the conversion of lead sulfate to lead carbonate will be poor. Upon introduction of the ammonium reagent into the battery mud, heat generated from the heat of solution and the heat of reaction will tend to raise the temperature of the battery mud. The battery mud temperature can be prevented from exceeding 140° F. in several manners. One technique for maintaining the temperature of the battery mud below about 140° F. is with use of cooling coils, cooling plates, or similar known devices. A preferred technique for maintaining battery mud temperature below 140° F. comprises introducing an ammonium reagent into the battery mud that is maintained as a sufficiently low temperature and a sufficiently low ammonium reagent concentration such that the resultant heats of solution and reaction will not raise the battery mud temperature above 140° F. The temperature and the concentration of the ammonium reagent required to maintain a battery mud temperature below about 140° F. is dependent upon ambient temperature, rate of batteries being processed, and configuration of the processing equipment. In general it has been found that a 5 to 10% ammonium reagent concentration introduced at a temperature of less than about 110° F. will not cause resultant mud temperatures of greater than about 140° F.

The amount of ammonium reagents used should be about the stoichiometric amount of ammonium reagent required to react with the lead sulfate. However, amounts lesser or greater than stoichiometric may be employed.

In a preferred embodiment of this invention, the batteries are first partially drained of the acid solution and then crushed into small pieces. Either during or following crushing, the ammonium reagent is added to the crushed materials to neutralize any residual acid as well as for the purpose of desulfating the lead compounds. By adding the ammonium reagent at this point it eliminates the need for neutralizing the acid with another base. In addition, desulfating the lead compounds will proceed as further separation of the lead compounds occurs. Residence time, therefore, is decreased and plant throughput is thereby increased since the steps of neutralization, desulfation, and separation are combined. Additional ammonium reagent may be required in order to provide for neutralization of the residual sulfuric acid. The amount of additional ammonium reagent should be about the stoichiometric amount of ammonium reagent to react with the sulfuric acid.

After the ammonium reagent has been added to the crushed material, the crushed cases and separators, and crushed metallics are separated from the battery mud by such conventional methods such as vibrating screens, spiral classifiers and the like. During this separation the sulfates in the battery mud reaction with the ammonium reagent to form soluble ammonium sulfate and an aqueous solution of ammonium sulfate is thereby formed. Also during this separation, the lead sulfate is converted to a lead carbonate precipitate. After the battery mud has been separated from the crushed material, the aqueous ammonium sulfate solution is separated from the lead carbonate precipitate and the other lead containing compounds such as solid PbO and PbO$_2$ by conventional techniques such as settling and filtration. The desulfated lead values originally contained in the battery mud are then recovered by well known methods such as smelting.

In order to more fully describe the instant invention the following example is presented.

EXAMPLE

A typical plant operation for the desulfation of battery mud is shown in the schematic contained in the sole FIGURE. The lead acid batteries were received and placed in a storage area where the batteries were permitted to drain acid. The partially drained batteries are then fed to vibrator feed hopper, 10, which in turn feeds the batteries onto conveyor belt 11 which feeds the batteries to roll crusher 12 where the batteries are crushed. Second conveyor 13 transports the crushed batteries to a second crusher 14 which commutates the batteries into small segments comprising crushed metallics, crushed cases and separators and battery mud. The crushed metallics comprise crushed lead alloy grids and terminals while the battery mud sulfuric acid, lead sulfate, PbO, and $PbO_2$.

At crusher 14 a 7% by weight aqueous solution of ammonium carbonate was added with use of line 15 to the crushed material. The ammonium carbonate neutralized the residual sulfuric acid and began to convert the lead sulfate to lead carbonate precipitate and to an aqueous solution of ammonium sulfate by the following reactions:

$$H_2SO_4 + (NH_4)_2CO_3 \rightarrow (NH_4)_2SO_4 + CO_2 \uparrow + H_2O$$

$$PbSO_4 + (NH_4)_2CO_3 \rightarrow PbCO_3 + (NH_4)_2SO_4$$

The treated battery mud was maintained a temperature of less than 140° F. Crushed battery material from second crusher 14 was then fed over line 16 to vibrating screen 17. The battery mud and the small metallics fines passed through vibrating screen 17. The crushed battery cases and separators and larger crushed metallics passed over vibrating screen 17 and were removed over line 18. Sprays of recycled water introduced over line 40 were directed onto the screen to clean the larger crushed pieces as well as to assist in passing the battery mud through screen 17. The undersize, battery mud and metallic fines, from vibrating screen 17 were then fed over line 19 into spiral classifier 20. At this point it was determined that about 40% of the lead sulfate had been converted to lead carbonate.

At spiral classifier 20, the metallic fines were carried up to the classifier and fed into a ball mill 21. The ball mill, by a hammering action, separated any battery mud still adhering to the crushed metallic fines. The metallic fines and battery mud from ball mill 21 were then transferred over line 22 to vibrating screen 23. Recycled water stream from line 24 was directed to vibrating screen 23. The battery mud was separated from the metallic fines by passing through the vibrating screen 23, and was then transferred over line 25 into collection tank 26. The metallic fines were removed from vibrating screen 23 over line 27.

The overflow from the spiral classifier 20, containing primarily battery mud and residual crushed battery separators, was transferred over line 28 to vibrating screen 29. A recycled water stream was directed to vibrating screen 29 over line 30. The residual battery separators passed over the vibrating screen 29 and were removed over line 31. The battery mud passed through vibrating screen 29 and was also transferred to collection tank 26 over line 32.

At collection tank 26 it was determined that about 85% of the lead sulfate had been converted to lead carbonate. The slurry in collection tank 26 was determined to be approximately 15% solids and 85% of an aqueous solution of ammonium sulfate and as yet unreacted ammonium reagent. The solids of the slurry were comprised of PbO, $PbO_2$, lead carbonate and as yet, unreacted lead sulfate. The slurry in the collection tank was then transferred over line 33 by a pump to thickening tank 34. In thickening tank 34 the slurry was concentrated from about 15% solids to about 60% solids, and the conversion of lead sulfate to lead carbonate essentially completed. As the solids content concentrated in the bottom of thickening tank 34, a clear aqueous solution of ammonium sulfate formed at the top of the tank. The solution containing about 10% ammonium sulfate was then removed over line 35 from the concentrated slurry. Part of this ammonium sulfate solution was used as the source of recycled wash water described previously in this example.

The 60% concentrated slurry was then fed over line 36 by a pump. At vacuum filter 37 the aqueous solution of slurry was removed over line 38 and the solids in the form of a 15% moist filter cake were removed over line 39.

The sulfate concentration of the lead bearing material originally contained in the battery was reduced by 90%.

The filter cake was then pelletized and further dried to a moisture content of 10% and then stored to serve as feed for subsequent conversion to lead by smelting.

It is claimed:

1. A process for desulfating battery mud, comprising:
   (a) Adding an aqueous solution containing an ammonium reagent selected from the group consisting of ammonium carbonate, ammonium bicarbonate, and admixtures thereof to a lead sulfate-containing battery mud maintained at a temperature of less than about 140° F. at substantially atmospheric pressure to form an aqueous slurry of ammonium sulfate and precipitated lead carbonate having a solids content of from about 10% to 20%, and
   (b) separating said ammonium sulfate slurry from said lead carbonate containing battery mud.

2. A process for desulfating battery mud in a lead-acid battery recycling process, comprising:
   (a) crushing lead-acid batteries to obtain a crushed material comprising crushed battery cases and separators, crushed metallics, and battery mud comprising sulfuric acid, $PbSO_4$, PbO, and $PbO_2$;
   (b) adding an aqueous solution containing an ammonium reagent selected from the group consisting of ammonium carbonate, ammonium bicarbonate, and admixtures thereof, to said crushed material which is maintained at a temperature of less than about 140° F. at substantially atmospheric pressure to form an aqueous slurry of ammonium sulfate and precipiated lead carbonate having a solids content of from about 10% to 20%;
   (c) separating said crushed battery cases and separators, and said crushed metallics from said battery mud containing said precipitated lead carbonate; and
   (d) separating said battery mud and said ammonium sulfate.

* * * * *